Jan. 8, 1946.  M. RADONICH  2,392,408
CEMENT APPLYING PROCESS
Filed Oct. 14, 1943
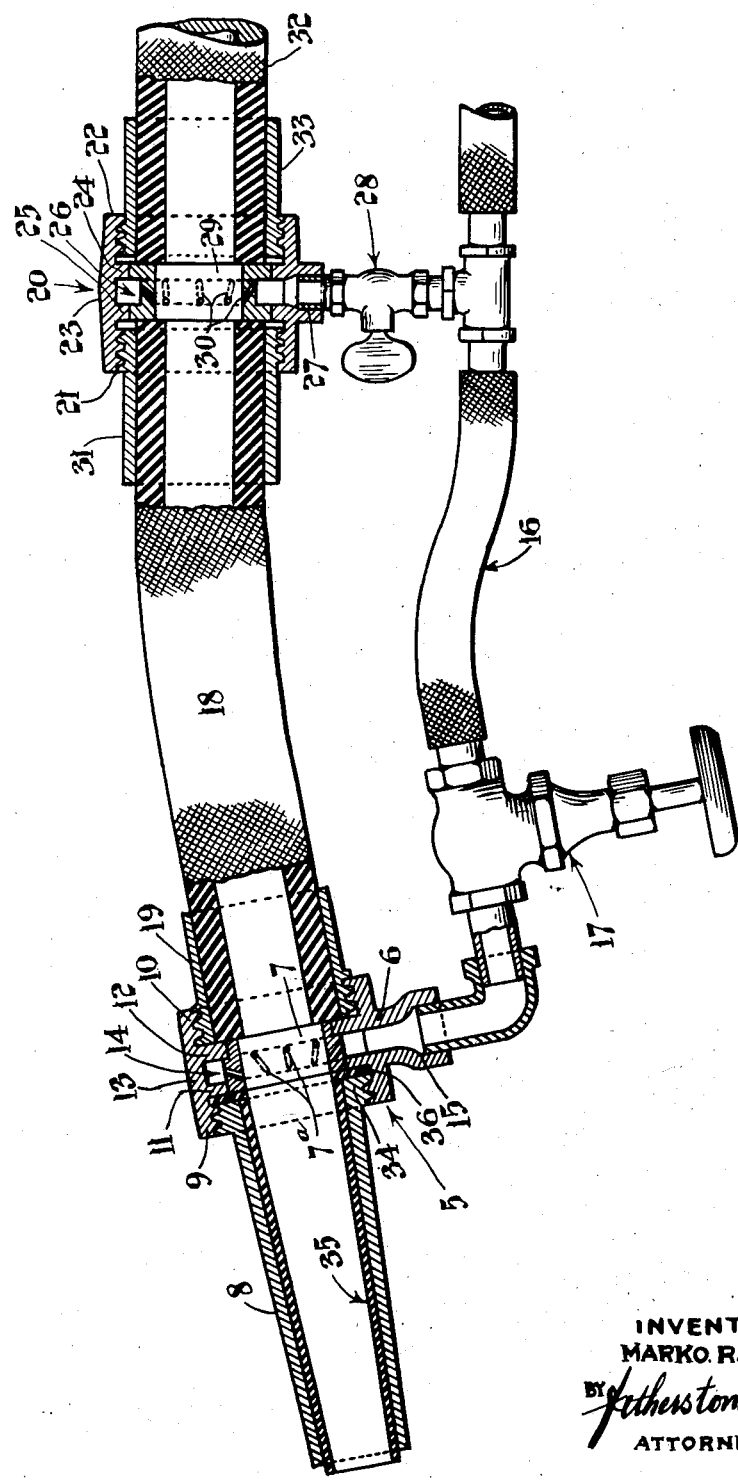
INVENTOR
MARKO. RADONICH
BY Featherstonhaugh & Co.
ATTORNEYS

UNITED STATES PATENT OFFICE 2,392,408

CEMENT APPLYING PROCESS

Marko Radonich, Montreal, Quebec, Canada

Application October 14, 1943, Serial No. 506,227

1 Claim. (Cl. 259—147)

This invention relates to pneumatic cement applying process in which compressed air is utilized to "shoot" a hydrated mixture of sand and cement through a nozzle onto the surface to be coated.

In this process the sand and cement mixture is delivered to the nozzle through a flexible hose or conduit and the total amount of water required for hydration is supplied through the water passages of a water ring located in the nozzle body at a relatively short distance from the discharge orifice of the nozzle tip.

I have discovered that the problem of obtaining satisfactory hydration of the aggregate without using an excessive amount of water may be solved in a simple and effective manner by adding a part of the required amount of water to the sand and cement aggregate before it reaches the conventional water ring in the nozzle body and then adding the balance of the water at said water ring. The wetting or partial hydration of the sand and cement aggregate resulting from the addition thereto, at a point in advance of the conventional water ring, of a part of the total amount of water required for hydration, apparently changes the properties of the aggregate so that when the balance of the required amount of water is added at the conventional water ring, complete hydration takes place during the short time required for the aggregate to pass from the conventional water ring to the discharge orifice of the nozzle. This improved method of hydrating the aggregate results in a considerable saving in materials since it eliminates the formation of the usual fog of small and light particles between the nozzle and the area of the surface upon which the material is impinged or "shot." This fog consists largely of cement and finer particles of sand and is blown away and wasted by the escaping compressed air. It also results in an improved cementitious material "in situ" due to a somewhat reduced content of cement per volume of placed material, it being well recognized in the trade that the undesirable shrinkage of such cementitious materials is proportionate, to a degree, to the cement content per unit. In practice very satisfactory results have been obtained when approximately one-third of the required amount of water is added to the sand and cement aggregate at one or more points suitably located in advance of the conventional water ring located in the nozzle body. In this connection it is important that the proportion of the required amount of water which is added to the sand and cement aggregate before it reaches the conventional water ring in the nozzle body should not be so great as to promote adherence of excessively wet portions of the mixture to the walls of the supply conduit with consequent rapid "building up" of such adherent areas and resulting in choking of the conduit.

Proceeding now to a more detailed description reference will be had to the accompanying drawing, in which the single figure is a view, partly in side elevation and partly in longitudinal section, of a pneumatic cement applying apparatus embodying my invention.

In the drawing, 5 designates a conventional nozzle assembly comprising nozzle body 6, water ring 7, and nozzle tip 8.

The nozzle body 6 is provided with internally threaded end portions 9 and 10 and with a central portion shaped to provide the side walls 11 and 12 and the outer circumferential wall 13 of an annular water passage 14. The water ring 7 is fitted in place so that it forms the inner circumferential wall of water passage 14. This ring is pierced by circumferentially spaced ports 7a, placing the central opening thereof in communication with said water passages.

Water passage 14 is provided with an inlet 15 to which water is supplied under pressure by a water supply hose 16 equipped with a control valve 17 which is operable to regulate the amount of water supplied to said water passage. The water is discharged from passage 14 through the water ring ports 7a which are inclined in the usual manner to direct the discharged water toward the discharge orifice of the nozzle tip 8.

One end of a flexible hose or conduit section 18 is secured to the nozzle body 6 by an externally threaded coupling member 19 which is screwed into the threaded end 10 of said body. The other end of hose or conduit section 18 is secured to a member 20 which is a substantial duplicate of the nozzle body 6, being provided with internally threaded end portions 21 and 22 and with a central portion shaped to provide the side walls 24 and 25 and the outer circumferential wall 23 of an annular water passage 26 having an inlet 27 through which water is supplied under pressure from water supply hose 16 through a control valve 28. The inner circumferential wall of water passage 26 is formed by a water ring 29 provided with inclined ports 30 placing the central opening of said ring in communication with the interior of said water passage. The hose or conduit section 18 is secured to member 20 by a coupling 31 which is screwed into the threaded end 21 of said member. A further hose or conduit section 32 is secured to member 20 by a coupling 33 which is screwed into the end 22 of said member.

The nozzle tip 8 is formed with an enlarged threaded inner end 34 which is screwed into the threaded end 9 of nozzle body 13. A rubber liner 35 is arranged in the nozzle tip and is provided with an outwardly flanged inner end 36 which is clamped between the inner end 34 of the nozzle tip and the adjacent side wall 11 of water passage 14.

In the use of the apparatus described herein the mixture of sand and cement is forced through the conduit sections 32 and 18 and through the nozzle assembly by air pressure in the usual manner. A part of the total amount of water required for hydration is added to the sand and cement mixture at the water ring 29 of the member 20, the balance of the water being added to the sand and cement mixture at the conventional water ring 7 in the nozzle body 6. The valves 17 and 28 are preferably arranged so that about one-third of the total amount of water required is added at the water ring 29 while the balance is added at the water ring 7. These proportions are not critical and may be varied. It is desirable, however, that the amount of water added at the water ring 29 should be the largest amount which it is feasible to add without danger of promoting the previously mentioned undesirable adherence of excessively wet portions of the mixture to the walls of the conduit. In practice exceptionally good results have been obtained when the initial or preliminary addition of water to the sand and cement aggregate is made through a water ring 29 located approximately 10½ inches in advance of the conventional water ring 7.

That part of the total amount of water which is added to the sand and cement aggregate before it reaches the conventional water ring 7 located in the nozzle body 6 need not necessarily be added at one point in advance of said conventional water ring but may be added at several advance points located along the length of the conduit through which the aggregate is delivered to the nozzle. This can be accomplished, for example, by duplicating the water supply connection represented by the member 20 and the water ring 29 at several points along the length of the conduit through which the aggregate is supplied to the nozzle body 6.

Having thus described what I now consider to be the preferred embodiments of this invention, it is pointed out that various modifications may be resorted to within the scope and spirit of the invention as defined by the appended claim. In this connection it will be understood that the arrangement shown in the drawing represents only one of various possible methods of reducing the invention to practice. The main feature is the introduction of the required amount of water at points located different distances from the discharge orifice of the nozzle tip and this may be accomplished by the use of spray or other water supply means differing from the illustrated arrangement.

I claim:

The method of hydrating the sand and cement aggregate supplied to the delivery nozzle of a pneumatic cement applying apparatus which comprises propelling the mixture by compressed air to and through a nozzle, adding a part of the required amount of water to the aggregate less than will promote building-up of adherent areas on the wall of the pneumatic cement applying apparatus tending to choke the same and at one or more points located an appreciable distance in advance of the point where the aggregate enters said nozzle and while the aggregate is being propelled to the nozzle and adding the balance of the required amount of water to the aggregate at said nozzle.

MARKO RADONICH.